United States Patent
Langereis et al.

(10) Patent No.: US 10,841,883 B2
(45) Date of Patent: Nov. 17, 2020

(54) NETWORK NODE AND METHOD FOR UE SPECIFIC POWER HANDLING

(71) Applicant: Telefonaktiebolaget LM Ericsson (publ), Stockholm (SE)

(72) Inventors: Alexander Langereis, Sigtuna (SE); Magnus Finne, Sundbyberg (SE); Mikael Jonsson, Vällingby (SE); Magnus Hurd, Stockholm (SE); Liping Wang, Täby (SE); Jing Rao, Sollentuna (SE); Stéphane Tessier, Stockholm (SE); Jianwei Zhang, Solna (SE)

(73) Assignee: Telefonaktiebolaget LM Ericsson (publ) Stockholm (SE)

( * ) Notice: Subject to any disclaimer, the term of this patent is extended or adjusted under 35 U.S.C. 154(b) by 0 days.

(21) Appl. No.: 16/098,392

(22) PCT Filed: May 10, 2016

(86) PCT No.: PCT/SE2016/050417
§ 371 (c)(1),
(2) Date: Nov. 1, 2018

(87) PCT Pub. No.: WO2017/196212
PCT Pub. Date: Nov. 16, 2017

(65) Prior Publication Data
US 2019/0150101 A1    May 16, 2019

(51) Int. Cl.
*H04W 52/28* (2009.01)
*H04W 52/36* (2009.01)
*H04W 52/14* (2009.01)

(52) U.S. Cl.
CPC ......... *H04W 52/28* (2013.01); *H04W 52/365* (2013.01); *H04W 52/146* (2013.01)

(58) Field of Classification Search
None
See application file for complete search history.

(56) References Cited

U.S. PATENT DOCUMENTS

| | | | | |
|---|---|---|---|---|
| 2011/0069685 A1* | 3/2011 | Tofighbakhsh | ..... | H04L 41/5067 370/338 |
| 2011/0105173 A1* | 5/2011 | Haim | ................. | H04W 52/244 455/522 |

(Continued)

FOREIGN PATENT DOCUMENTS

WO    2011002374 A1    1/2011

OTHER PUBLICATIONS

Author Unknown, "Technical Specification Group Radio Access Network; Evolved Universal Terrestrial Radio Access (E-UTRA); User Equipment (UE) radio transmission and reception (Release 10)," Technical Specification 36.101, Version 10.2.0, 3GPP Organizational Partners, Mar. 2011, 225 pages.

(Continued)

*Primary Examiner* — Mohammed Rachedine
(74) *Attorney, Agent, or Firm* — Withrow & Terranova, PLLC

(57) ABSTRACT

Embodiments herein relate to a method, performed by a network node, for handling of specific power reduction for a User Equipment (UE). The network node receives a message from the UE comprising an identification of a specific type of the UE. The network node obtains a reduced power applied by the UE corresponding to the received identification. The network node selects an allocation for transmissions from the UE, based on the reduced power applied by the UE. Embodiments herein further relate to a network node for performing the method for handling of specific power reduction for a UE.

14 Claims, 7 Drawing Sheets

(56) References Cited

U.S. PATENT DOCUMENTS

| | | | | |
|---|---|---|---|---|
| 2012/0176923 A1* | 7/2012 | Hsu | .................... | H04W 52/243 |
| | | | | 370/252 |
| 2012/0178494 A1* | 7/2012 | Haim | .................... | H04W 52/34 |
| | | | | 455/522 |
| 2013/0254370 A1* | 9/2013 | Hu | .................... | H04M 15/752 |
| | | | | 709/223 |
| 2015/0215943 A1* | 7/2015 | Vajapeyam | ......... | H04W 52/367 |
| | | | | 370/329 |
| 2015/0282093 A1 | 10/2015 | Kaukovuori et al. | | |
| 2018/0324705 A1* | 11/2018 | Yu | ........................ | H04L 1/0026 |

OTHER PUBLICATIONS

Author Unknown, "Technical Specification Group Radio Access Network; Evolved Universal Terrestrial Radio Access (E-UTRA); User Equipment (UE) radio transmission and reception (Release 13)," Technical Specification 36.101, Version 13.0.0, 3GPP Organizational Partners, Jul. 2015, 699 pages.

Author Unknown, "Technical Specification Group Radio Access Network; Evolved Universal Terrestrial Radio Access (E-UTRA); Medium Access Control (MAC) protocol specification (Release 13)," Technical Specification 36.321, Version 13.1.0, 3GPP Organizational Partners, Mar. 2016, 85 pages.

International Search Report and Written Opinion for International Patent Application No. PCT/SE2016/050417, dated Dec. 12, 2016, 11 pages.

Examination Report for European Patent Application No. 16727857.1, dated Sep. 4, 2019, 6 pages.

Examination Report for European Patent Application No. 16727857.1, dated Nov. 29, 2019, 5 pages.

* cited by examiner

NETWORK NODE AND METHOD FOR UE SPECIFIC POWER HANDLING

This application is a 35 U.S.C. § 371 national phase filing of International Application No. PCT/SE2016/050417, filed May 10, 2016, the disclosure of which is incorporated herein by reference in its entirety.

TECHNICAL FIELD

Embodiments herein relate to telecommunication networks, such as cellular radio networks. In particular, a method and a network node for handling of specific power reduction of User Equipment (UEs) in a wireless telecommunications network are disclosed.

BACKGROUND

Communication devices such as User Equipment (UEs) are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

The non-limiting term UE refers to any type of wireless device communicating with a radio network node in a cellular or mobile communication system. Examples of UE are target device, device to device UE, machine type UE or UE capable of machine to machine communication, PDA, iPAD, Tablet, mobile terminals, smart phone, Laptop Embedded Equipment (LEE), Laptop Mounted Equipment (LME), USB dongles etc. UEs may further be referred to as wireless terminals, wireless devices (WD), mobile terminals and/or mobile stations, mobile telephones, cellular telephones, laptops, tablet computers or surf plates with wireless capability, Machine Type Communications (MTC) devices just to mention some further examples. The UEs in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area being served by a radio network node. A cell is the geographical area where radio coverage is provided by the radio network node. The non-limiting term radio network node refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

In some embodiments the general term "network node" is used and it can correspond to any type of radio network node or any network node, which communicates with at least a radio network node. Examples of network node are any radio network node stated above, core network node (e.g. MSC, MME etc), O&M, OSS, SON, positioning node (e.g. E-SMLC), MDT etc. The network node may further control several transmission points, e.g. having Radio Units (RRUs). A cell can thus comprise one or more network nodes each controlling one or more transmission/reception points. A transmission point, also referred to as a transmission/reception point, is an entity that transmits and/or receives radio signals. The entity has a position in space, e.g. an antenna. A network node is an entity that controls one or more transmission points.

Further, each network node may support one or several communication technologies. The network nodes communicate over the air interface operating on radio frequencies with the UEs within range of the network node. In the context of this disclosure, the expression Downlink (DL) is used for a transmission path from the base station to the mobile station. The expression Uplink (UL) is used for a transmission path in the opposite direction, i.e. from the UE to the base station.

In 3rd Generation Partnership Project (3GPP) Long Term Evolution (LTE), base stations, which may be referred to as eNodeBs or eNBs, may be directly connected to one or more core networks. In LTE, the cellular communication network is also referred to as Evolved Universal Terrestrial Radio Access Network (E-UTRAN).

An E-UTRAN cell is defined by certain signals which are broadcasted from the eNB. These signals contain information about the cell which can be used by UEs in order to connect to the network through the cell. The signals comprise reference and synchronization signals which the UE uses to find frame timing and physical cell identification as well as system information which comprises parameters relevant for the whole cell.

Note that although terminology from 3GPP LTE has been used in this disclosure to exemplify the embodiments herein, this should not be seen as limiting the scope of the embodiments herein to only the aforementioned system. Other wireless systems, including WCDMA/UMTS, WiMax, Ultra Mobile Broadband (UMB) and the Global System for Mobile communication (GSM), may also benefit from exploiting the ideas covered within this disclosure. The solution is described in terms of a LTE network with Evolved Packet Core (EPC). The embodiments disclosed herein may be applicable to other cellular and wireless systems as well, such as WCDMA/UMTS.

In LTE there is only one power class defined for a UE, known as power class 3, corresponding to a maximum output power of 23 dBm. However, according to 3GPP specifications, the UE maximum output power may be reduced by a number of factors. These factors are e.g. Maximum Power Reduction (MPR), Additional MPR (A-MPR), ΔTc and Power Management MPR (P-MPR). ΔTc is a 1.5 dB reduction in the lower limit of the maximum output power range when the signal is within 4 MHz of the channel edge. P-MPR, introduced in 3GPP TS 36.101 V10.2.1, allows the UE to reduce its output power when other constraints are present. For example multi-Radio Access Technology (RAT) terminals may have to limit LTE transmission power if transmission in another RAT is taking place in parallel. The maximum allowed power reductions can be significant; such as e.g. more than 6 dB.

The purpose of MPR is to allow the UE to reduce its output power in some demanding configurations to meet general requirements on signal quality and spurious emissions. Under certain circumstances, it may not be possible for a UE, depending on the UEs capabilities on filtering, to meet these requirements if the uplink transmission power determined by the normal upper limits is used. MPR values are depending on modulation used as well as usage of Uplink Carrier Aggregation and Uplink transmissions with a non-contiguous resource allocation.

The purpose of A-MPR is to allow the UE to further reduce its output power to meet additional requirements for spectrum emission mask and spurious emissions for certain combinations of E-UTRA bands and channel bandwidths.

The usage of MPR and A-MPR is an allowance and UEs are not enforced to apply the maximum allowed power reduction. In 3GPP TS 36.101 only maximum allowed values for both MPR and A-MPR in different scenarios are defined. High-end UEs may not need to reduce the uplink power at all while low-end UEs may have to reduce the uplink power by the maximum amount.

When the UE configures its output power ($P_{CMAX}$) it must in addition to its power class limitation and the maximum output power (P-max/$P_{EMAX}$) configured by the network node, such as e.g. by the eNB, also take the MPR and A-MPR into account. This is the reason why $P_{CMAX}$(defined in 3GPP TS 36.101 V10.2.1, is defined as a value within a range ($P_{CMAX\_L} < P_{CMAX} < P_{CMAX\_H}$) instead of as a single value. $P_{CMAX\_L}$ is the lower limit of how much the UE is allowed to reduce its power. The $P_{CMAX\_L}$ will depend on the allowed MPR/A-MPR and for some transmission bandwidths an additional 1.5 dB allowed power reduction ($\Delta T_c$) will also impact the $P_{CMAX\_L}$.

In the case of non-contiguous resource allocation, one of the main concerns is the out-of band emission. The out-of band emission originates mainly from third order products of allocated frequencies. Non-contiguous allocation can thus lead to fragmented allocations where just a few PRBs are allocated far from other allocated PRBs. This configuration can potentially generate more out-of band emission since the energy of each allocated PRB may be high, since only a few PRBs are allocated, and therefore, the third product can lead to frequencies outside the system bandwidth. Hence, MPR may be applied in order to decrease these out-of band emissions when non-contiguous transmissions are used.

There is a lot of freedom for the UE vendors to decide to what extent power reduction shall be used, and if they use it, it is up to the UE vendor to select which specific reduction levels that shall apply, up to an maximum limit defined in 3GPP TS 36.101 V10.2.1. Due to this freedom the network node may have difficulties handling the power reduction of the UEs, which may decrease the performance of telecommunication networks.

SUMMARY

It is therefore an object of embodiments herein to enhance the performance in a telecommunications network.

According to a first aspect of embodiments herein, the object is achieved by a method, performed by a network node, for handling of specific power reduction for a User Equipment (UE). The network node receives a message comprising an identification of a specific type of the UE from the UE. The network node obtains a reduced power applied by the UE corresponding to the received identification. The network node further selects an allocation for transmissions from the UE, based on the reduced power applied by the UE.

According to a second aspect of embodiments herein, the object is achieved by a method, performed by a User Equipment (UE), for enabling a handling of specific power reduction for the UE. The UE sends a message comprising an identification of a specific type of the UE to the network node. The UE receives a message from the network node triggering the UE to transmit information regarding an available power headroom for one or more allocations. The UE further sends a report to the network node, comprising information regarding the available power headroom for the UEs allocation and a maximum power available for the allocation.

According to a third aspect of embodiments herein, the object is achieved by a network node for handling of specific power reduction for a User Equipment (UE). The network node is configured to receive a message from the UE comprising an identification of a specific type of the UE. The network node is configured to obtain a reduced power applied by the UE corresponding to the received identification. The network node is further configured to select an allocation for transmissions from the UE, based on the reduced power applied by the UE.

According to a second aspect of embodiments herein, the object is achieved by a User Equipment (UE), for enabling a handling of specific power reduction for the UE. The UE is configured to send a message to the network node comprising an identification of a specific type of the UE. The UE is configured to receive a message from the network node triggering the UE to transmit information regarding an available power headroom for one or more allocations. The UE is further configured to send a report to the network node comprising information regarding the available power headroom for the UEs allocation and a maximum power available for the allocation.

The embodiments described herein allow the network node to utilize the maximum available UL power for UEs that are allowed to apply a power reduction. This will lead to an UL performance gain equal to the difference between the actual used power reduction and the maximum power reduction as allowed by 3GPP TS 36.101 V10.2.1. This difference may range from 0 to several decibels.

As a result the UL coverage and UL performance is increased significantly in all cases where UEs apply less power reduction than the maximum power reduction allowed by 3GPP TS 36.101 V10.2.1.

BRIEF DESCRIPTION OF THE DRAWINGS

Examples of embodiments herein are described in more detail with reference to attached drawings in which.

DETAILED DESCRIPTION

Figure 1:
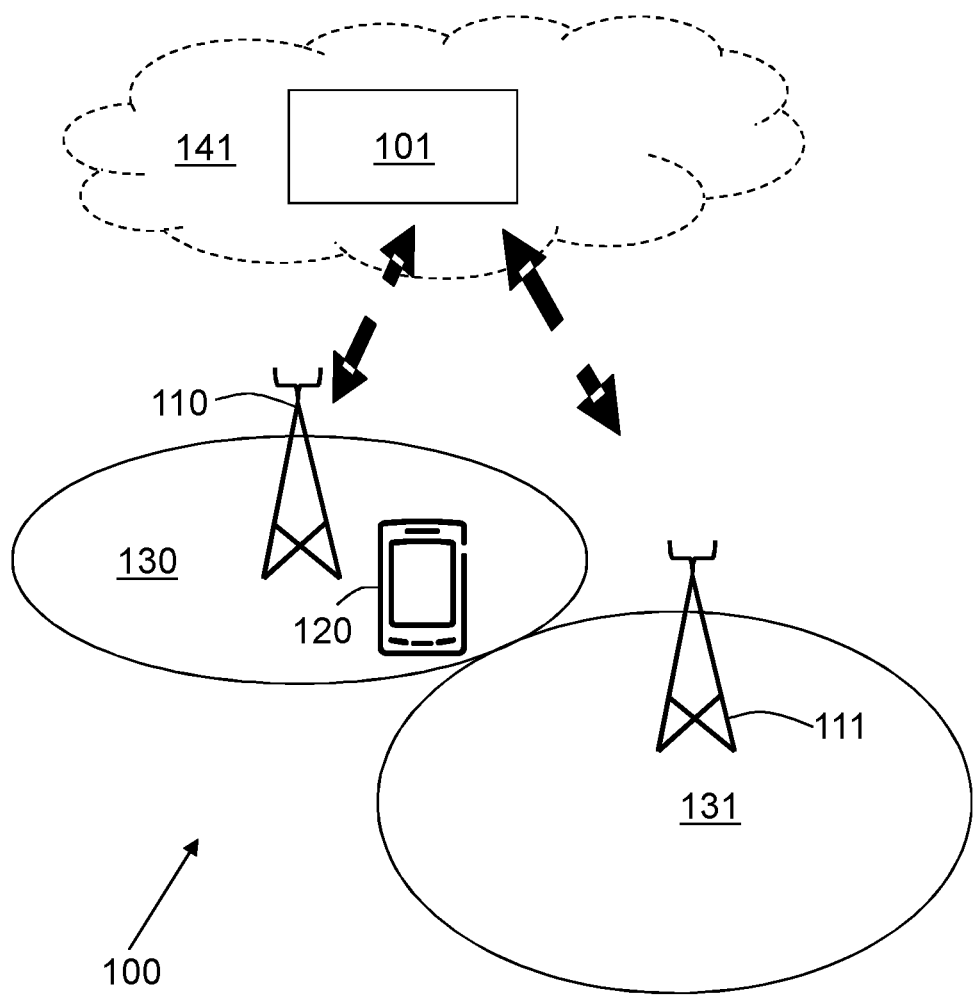
FIG. 1 is a schematic block diagram illustrating an embodiment of a wireless communications network.

In order to further appreciate the benefits of the embodiments herein, the networks behavior due to power reduction of the UEs have been studied by the present inventors. These studies have shown that at least some UE types may use a lower power reduction than the maximum power reduction value specified by 3GPP TS 36.101 V10.2.1 would allow. In a studied scenario a UE was scheduled for transmission with non-contiguous resource allocation in a single component carrier in UL and was allowed to use MPR. While a power reduction of 4 dB was allowed only 2 dB was used by the UE. The network node would in such a scenario currently assume a specified maximum power reduction value to be used when determining a Modulation and Coding Scheme (MCS) to be used for transmissions from the UE. Since the network node does not have information about the real UE power reduction it will assume that the UE applies the specified maximum power reduction instead of the actual power reduction applied by the UE. For such UEs the performance may be limited since the estimated available power in the network node may be lower than the actual transmission power available in the UE. Thereby, the UL performance may be decreased by several decibels in comparison to the performance possible for the actual power reduction of the UE. In the future the UEs may also be developed to have less and less power reduction, using better transceivers, filters and algorithms to decrease their need for power reduction. However, in order to fully benefit from these improvements the network node must be aware of the available UE power.

As described above, only a maximum power reduction is defined in 3GPP TS 36.101 V10.2.1. The power applied by the UE is only specified to be within a range. This means there is no detailed knowledge on the network side whether a certain UE 120 is applying power reduction for a specific transmission or not. An example when this uncertainty about the applied power becomes important is in the context of transmissions with non-contiguous resource allocation in single component carrier, which may also be referred to as clustered transmission, in uplink. In this case the uplink transmission is distributed over two clusters, each cluster consisting of contiguous Scheduling Blocks (SBs); moreover, for these clustered transmissions a specific power reduction is applied (represented by MPR) compared to single-cluster transmissions.

The embodiments described herein provide an accurate prediction of available UE power when the UE, identified by e.g. its masked IMEISV, is allowed to apply power reduction due to for example A-MPR and MPR. In particular the embodiments described herein allow the network node to utilize the maximum transmission power available in the UE when the network node schedules the UL transmission from the UE, in a scenario where the UE uses less power reduction than the maximum power reduction specified in 3GPP TS 36.101 V10.2.1.

Not only non-contiguous uplink transmission may gain from the solution according to embodiments described herein, also Uplink Carrier Aggregation uses MPR and may have a similar gain. Furthermore A-MPR may be used in many other scenarios and the solution may be used here as well. The maximum power reduction for A-MPR is less than for MPR but is still in the order of a few decibels.

One of the aims of a UE vendor is to improve the performance of the UE by reducing the power reduction, since this will increase the maximum available UE power. Lessening of the power reduction is part of the UE development, which comprises hardware improvements and algorithm development. Therefore the gain is expected to increase in the future. A first case of less than allowed MPR has already been observed. In that case the UE was allowed to apply 4 decibel power reduction due to MPR but only reduced the power with 2 decibel.

The method according to the embodiments described herein rely on obtaining and storing an actual UE power usage as reported by the UE, e.g. in an extended Power Headroom Report (ePHR), in the network per UE identification, such as e.g. per masked IMEISV. In case an unknown IMEISV, i.e. an IMEISV for which no UE power usage has been stored, is encountered, the embodiments herein provide methods to determine the actual power reduction data set and to store the data for the IMEISV for later use. The data may e.g. be stored in a network node, such as a core network node or a radio network node.

As a result the UL coverage and UL performance may be increased significantly in all scenarios where the UE applies less power reduction than it is allowed to do. For scenario's with MPR this may result in a gain of several decibels.

FIG. 1 depicts an example of a communications network 100 adapted to wirelessly serve a UE 120 according to a first scenario in which embodiments herein may be implemented. The communications network 100 may be a wireless communication network such as an LTE, E-Utran, WCDMA, GSM network, any 3GPP cellular network, Wimax, or any cellular network or system.

The communications network 100 comprises a plurality of radio access (RA) nodes whereof two, a first RA node 110 and a second RA node 111 are depicted in FIG. 1. The first RA node 110 and the second RA node 111 are network nodes which each may be a transmission point such as a radio base station, for example an eNB, an eNodeB, or an Home Node B, an Home eNode B or any other network node capable to wirelessly serve a wireless terminal such as a user equipment or a machine type communication device in a wireless communications network. The first RA node 110 and the second RA node 111 each serves at least one cell 131, 132.

The communication network 100 further comprises a network node 101 which is configured to communicate with at least one RA node 110, 111. The network node 101 may be a core network node or a distributed node where the functionality is comprised in a first cloud 141. The network node 101 and the functionality of the network node 101 may however also be comprised in or comprise one of the RA nodes 110, 111.

The wireless communications network 100 comprises a User Equipment (UE) 120. The first RA node 110 and the second RA node 111 may each be a transmission point for the UE 120. The UE 120 is within radio range of the first RA node 110 and the second RA node 111, this means that it can hear signals from the first RA node 110 and the second RA node 111. The UE 120 may e.g. be a, a wireless terminal, a wireless device, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term wireless terminal used in this document also covers other wireless devices such as Machine to machine (M2M) devices.

Figure 2:
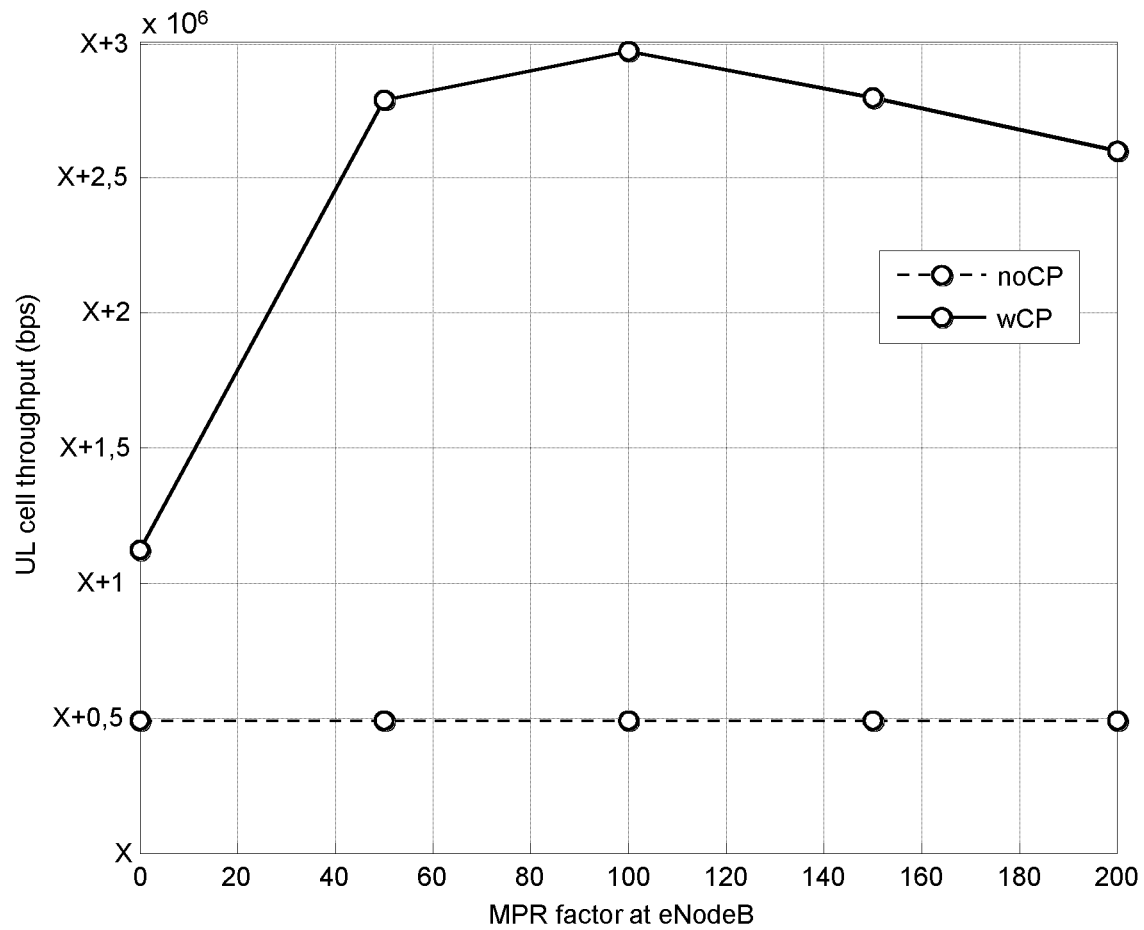
FIG. 2 is a diagram illustrating a performance impact from a mismatch between actual power reduction by a UE and assumed power reduction assumed by a network node.

FIG. 2 shows the impact on UL cell throughput due to a mismatch between what power has been used in the UE 120 compared to the power estimated by the network node, for a UE 120 that supports non-contiguous uplink transmission on two clusters.

The network node 101 may assume the UE 120 to use maximum power reduction corresponding to MPR from a maximum power level, which maximum power level is known by both the UE 120 and the network node 101. The network node 101 may estimate the power by guessing the applied MPR. The accuracy of the network nodes estimation of the actual power reduction is represented by the MPR factor which is multiplied to the MPR value applied by the UE 120 for non-contiguous uplink allocation. MPR=100% indicates that the estimation performed by the network node 101 is exactly correct.

In the example described in FIG. 2, the MPR factor estimated by the network node 101, such as e.g. the eNB, has been varied in the range from 0 to 200. As can be seen a performance peak occurs when there is a match in the power reduction applied by the UE 120 and the power reduction estimated by the network node 101, i.e. when the MPR factor is equal to 100%, while the performance degrades when the mismatch is increasing.

In FIG. 2, a second case without non-contiguous uplink transmission on PUSCH is shown for reference (noCP). Since in this case no MPR was applied there is no mismatch between the power used by the UE 120 and the estimation of the UE power in the network node.

An explanation for the decreased performance when the mismatch increases is related to Link Adaptation (LA). At certain points in LA it is necessary for the network node 101 to predict the transmitted UE power per resource block for a potential future transmission. This prediction will eventually be input to a selection of Modulation and Coding Scheme (MCS). If the calculation of future UE power is inaccurate this will lead to a non-optimal MCS selection which will limit network performance.

The simulations referred to are specifically related to mismatch in MPR values, however the result may be equally applicable for a mismatch in power reduction in general. Hence, looking at the simulation results it is evident that there is performance to gain by minimizing the mismatch in applied power reduction between the network node 101 and the UE 120, which is the purpose with the embodiments described herein.

A core network node, such as e.g. an MME, may maintain specific device type information which may be provided to a radio network node 110, 111, such as e.g. an eNB. The information indicates the type of the UE 120 and may be based on an IMEISV. The information may be stored in the form of Type Allocation Code (TAC)+Software Version Number (SVN) which is IMEISV less the serial number to make it impossible to identify individual devices. This UE identification may be referred to as masked IMEISV but for simplicity the following text will simply write IMEISV when masked IMEISV is meant.

Initially the UE 120 is unknown in the network 100 and will send its identification, such as e.g. its masked IMEISV, to the network node 101. The network node 101 may then determine if the identification is known with regards to a power reduction profile. In one embodiment, the determining may be done by transmission of the identification from a second network node, such as a core network node, to the network node 101. At Initial Connection Establishment the identification may be sent from the core network node, such as e.g. an MME, to the network node 101, which may e.g. be an eNB. The network node 101 may then determine if the identification is known in the context of the power reduction functionality. The identification may further be forwarded from a source network node to a target network node during inter-network node handover. It may also be received and stored during RRC Connection Re-establishment. This allows for the network node to make UE device specific decisions.

In 3GPP TS 36.101 V10.2.1, an extended Power Headroom Report (ePHR) is defined. A configured maximum UE output power ($P_{CMAX,c}$) is reported for each activated cell carrier in addition to power headroom and some other information. The configured maximum UE power includes power reduction due to any applied power reduction. The $P_{CMAX,c}$ is reported when the power headroom (PH) is based on a real transmission. The power reduction is an aggregate of all applied power reductions. Moreover, the power reduction may be a function of parameters like frequency band, allocated bandwidth, position of Resource Blocks (RBs), modulation used, the UE type, the UE model and the software version of the UE.

The $P_{CMAX,c}$ as reported in an ePHR includes the actual maximum power available for the active cell carrier, after power reduction, used for calculation of the reported power headroom for that cell carrier. From the ePHR it is therefore possible for the network node 101 to calculate the power reduction applied in UE 120 for the cell carrier and TTI that the ePHR is reporting for, this may also be referred to as the UEs allocation. The allocation described herein hence comprises a resource allocation in the time and frequency domain and an MCS that shall be used for the allocation resource allocation in the time and frequency domain. The reported power reduction may be equal to the maximum allowed power reduction as allowed by 3GPP but it has also been observed to be less. In some cases the power reduction reported may even be nonexistent.

The network node 101 according to some of the embodiments herein collects and saves the actual power reduction for an identified UE brand/type/model/software version. The UE 120 may be identified by a received identification. This identification may e.g. be the IMEISV number or an identification based on the IMEISV number of the UE 120. The solution according to the embodiments herein allows fast collection of missing power reduction data by triggering ePHRs for specific allocations. Alternatively, the known power reduction information may be stored and unknown power reduction values may be estimated by means of extrapolation or interpolation.

The power reduction information for several devices may be stored in the network node and/or in a central place of the network, for example in a core network node or in a distributed node comprised in the cloud. The power reduction information may be stored per identification, such as per IMEISV. The information may then be made available to the network node 101 when a UE 120 connects to the network node 101.

The actual power reduction applied by the UE 120 may then be used by the network node 101 for link adaptation (LA), which provides the possibility to utilize all available power from the UE 120 even when the UE 120 is allowed to apply an additional power reduction.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 3:
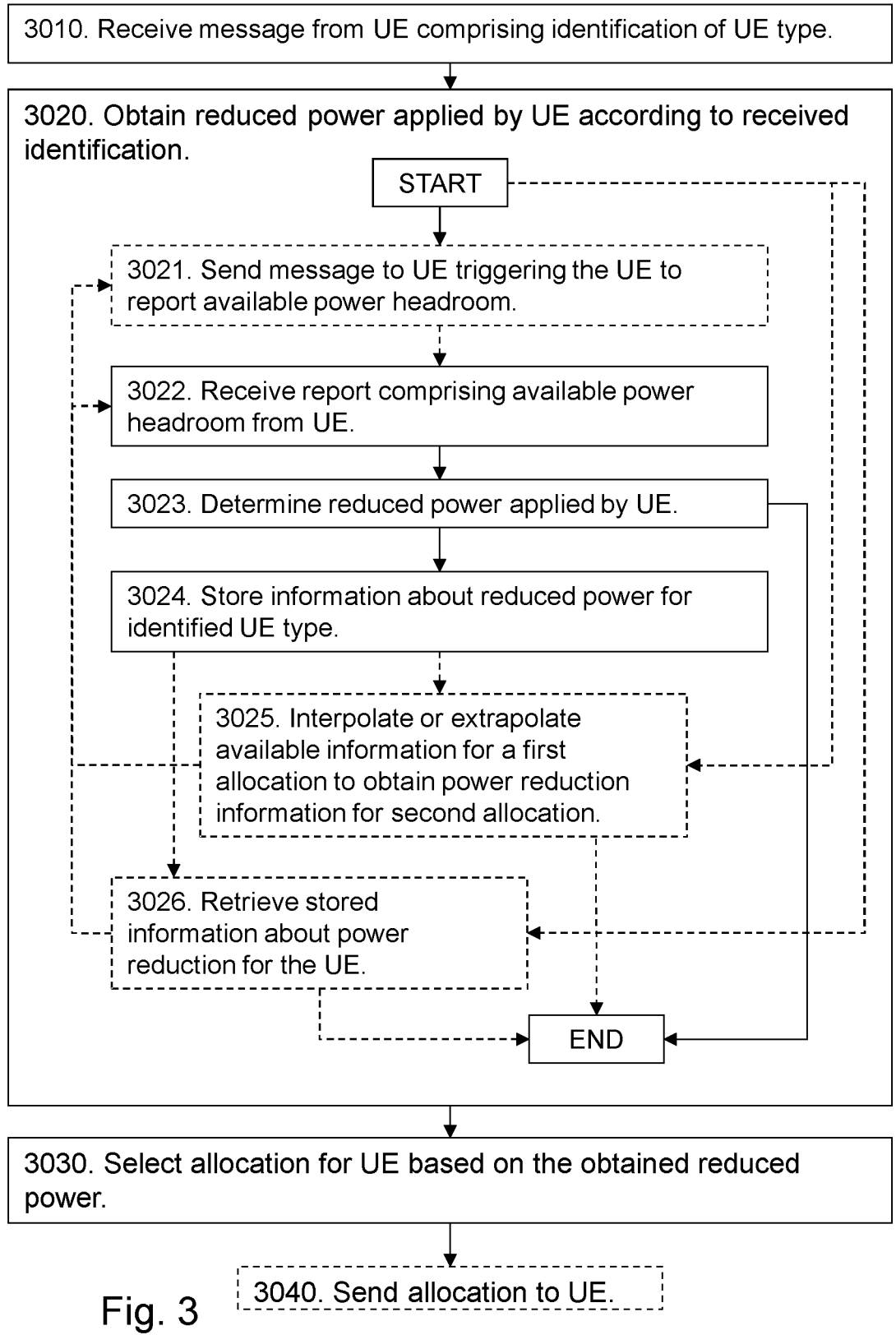
FIG. 3 is a flowchart depicting embodiments of a method in a network node.

Example of embodiments of a method in the network node 101 for handling of specific power reduction for a User Equipment (UE) 120 will now be described with reference to a flowchart depicted in FIG. 3. The network node 101 is configured to communicate with the UE 120 directly or via a RA node 110, 111. The method comprises the following actions, which actions may be taken in any suitable order. Dashed lines of a box in FIG. 3 indicate that this action is not mandatory.

Action 3010: The network node 101 receives a message from the UE 120 comprising an identification of a specific type of the UE 120. The type of the UE 120 may e.g. be the brand, the type, the model and/or the software of the UE 120.

Figure 4:
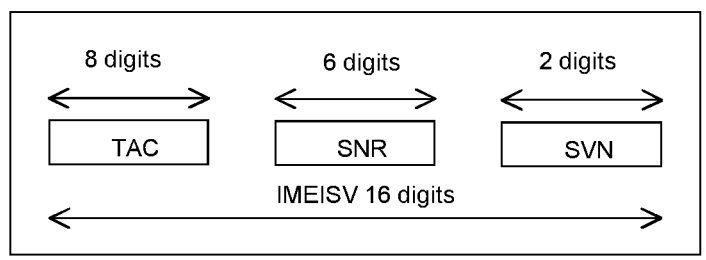
FIG. 4 is a block diagram illustrating a composition of a UE identification.

The identification may be based on an International Mobile station Equipment Identity Software Version (IMEISV) as disclosed in FIG. 4. The IMEISV consists of a Type Allocation Code (TAC), a Serial Number (SNR) and a Software Version Number (SVN). In order to make it impossible to identify individual devices the identification may be received in the form of Type Allocation Code (TAC)+Software Version Number (SVN) which is equal to the IMEISV less the Serial Number (SNR). This UE identification may be referred to as a masked IMEISV. The IMEISV may e.g. be masked by setting one or more digits of the SNR to "1".

The network node 101 may identify a UE 120 by its identification, such as e.g. an IMEISV or a masked IMEISV allowing the network node 101 to store UE type specific power reduction information in the core network node, such as an MME, or in other network nodes. The IMEISV becomes available to the network node 101 in all scenarios where a UE 120 enters a cell of the network node 101.

The embodiments allow to either actively collect actual power reduction information or to add unknown values as they occur and interpolate/extrapolate to determine unknown values. The information may be stored in the network per IMEISV. This allows for efficient information handling since the number of UE types is much less than the number of UEs.

Thereby an accurate prediction of the available UE power when the UE 120, identified by its IMEISV, is allowed to apply power reduction due to for example A-MPR and MPR may be performed. In particular, the method allows the network node to utilize all available transmission power if the UE uses less power reduction than the maximum reduction specified in 3GPP. Many UEs do already show this behavior and it is expected to occur more frequently in the future. In particular high-end UEs may use less power reduction than allowed.

Action 3020: When the network node 101 has received the identification of the UE 120, the network node 101 obtains a reduced power applied by the UE 120 corresponding to the received identification.

The network node 101 may obtain the information regarding the reduced power applied by the UE 120 in several different ways, dependent on the received identification and the information available for the received identification.

In case there is no information regarding the reduced power applied by the UE 120 available to the network node 101, the network node 101 may assume that the UE 120 will apply the maximum power reduction as allowed by the 3GPP specifications for the initial scheduling of the UE 120. The network node 101 may then start obtaining information regarding the UE specific power reduction for the unknown identification as soon as possible with respect to the load in the system.

Action 3021: In a first embodiment the network node 101 may obtain the information regarding the reduced power from the UE 120. The network node 101 may send a message to the UE 120, which message triggers the UE 120 to transmit information regarding an available power headroom for one or more allocations. In some embodiments herein, the network node 101 may trigger the UE to transmit information regarding an available power headroom for one or more allocations for which no information about the reduced power is available to the network node 101. Thereby the network node 101 may actively obtain the information from the UE 120. The network node 101 thereby orders the UE 120 to provide a complete set of power reduction data. The UE 120 does not necessarily have data for transmission, instead the UE 120 may be scheduled by the network node 101 mainly for collection of power reduction data.

The network node 101 may trigger the UE 120 to transmit the information regarding the available power headroom by sending a message for activation and/or deactivation of a secondary cell (SCell), this may e.g. be sent using a SCell activation/deactivation MAC control element. One of the actions triggered in the UE 120 when receiving a SCell activation/deactivation MAC control element which activates an SCell is creation of an extended Power Headroom Report (ePHR). The creation of the ePHR may also triggered when the UE 120 receives a MAC control element which does not change the activation/deactivation status of any SCell. This may e.g. be the case when an SCell is activated and the MAC control element orders activation of the already activated SCell. Hence, transmission of such MAC control elements may therefore be used by the network node 101 with the purpose of triggering the UE 120 to create a report, such as an ePHR. The network node 101 may therefore trigger such MAC control elements when the UE 120 is granted with an UL allocation for which the power reduction information of the UE 120 is not known yet, in order to receive a report comprising information for the unknown allocation.

The network node 101 or a scheduler in the network node 101 may further prioritize UL allocations which will produce power reduction information that is lacking for the UE identification, such as the IMEISV. The DL scheduler will then schedule SCell activation/deactivation MAC control elements that order the UE 120 to report the information for these UL allocations. The network node 101 may further schedule the UE in a plurality of allocations needed in order to get a complete power reduction information for the UE 120 and then trigger the UE 120 to send a power headroom report for these scheduled allocations.

Furthermore, the network node 101 may transmit UL grants to a UE type with the purpose to collect power reduction information while the UE 120 does not necessarily have data in its buffers. The power reduction applied by the UE 120 may be obtained by scheduling the UE 120 in one of its activated carriers in one of its MPR regions in the UL. At the same time an SCell activation/deactivation MAC control element ordering an activation of at least one SCell may be sent to the UE 120. This will trigger the UE 120 to create an ePHR. This may for example be used in low load scenario's but it may also be used as the default method to collect the power reduction information, since unknown UE identifications, such as masked IMEISVs, may not encountered often.

The applied power reduction characteristics may be specific per UE vendor, UE type, UE model and software version as specified by the UEs identification, such as e.g. the IMEISV. The UE 120 may for example be allowed to apply MPR for non-contiguous UL allocations of PUSCH resources. The specified maximum MPR that the UE 120 is allowed to apply may be calculated from the ratio $A=N_{RB\_alloc}/N_{RB}$, where $N_{RB\_alloc}$ is the number of allocated resource blocks and $N_{RB}$ is the number of available resource blocks. Since the power reduction applied by the UE 120 is depending on the allocation of the UE 120, the network may request reports comprising the power headroom, such as e.g. ePHRs, for several allocations of PUSCH resources. Additionally, the MPR may also depend on other parameters such as e.g. the modulation and/or the frequency band.

For example, for non-contiguous allocation within one band 3GPP 36.101 chapter 6.2.3 specifies three MPR regions, 0.00<A<=0.33, 0.33<A<=0.77 and 0.77<A<=1.00. In order for the complete power reduction of the UE 120 to be known by the network node 101, the network node 101 may have to send several messages triggering the UE 120 to send several reports, such as ePHRs, for several different allocations.

In some embodiments the method may also be applied for intra-band contiguous carrier aggregation with non-contiguous resource allocation or intra-band non-contiguous carrier aggregation with two uplink carriers and the MPR specified in 3GPP TS 36.101 V10.2.1 chapter 6.2.3A.

Action 3022: The network node 101 receives a report from the UE 120 comprising information regarding the available power headroom for an allocation of the UE 120 and a maximum power available for the allocation.

The network node may receive the available power headroom ($P_{CMAX,c}$) for one or more active cell carriers from the UE 120, which information may be used to determine which power reduction has been applied by the UE 120 for each cell carrier.

The network node 101 may further periodically check if the power reduction data available for a UE specified by an identification such as e.g. a IMEISV or a masked IMEISV is correct. The network node 101 may do this by monitoring ePHR reports that the UE transmits in ongoing traffic and by triggering ePHRs with activation/deactivation MAC control elements as described above.

Action 3023: When the network node 101 has received the report comprising information regarding the available power headroom from the UE 120, the network node determines the reduced power applied by the UE 120. The reduced power applied by the UE 120 is determined based on the received available power headroom $P_{cmax,c}$ and the maximum power $P_{max}$ available for the allocation. In the following an example of an actual UE power reduction calculation will be described:

When the network node 101 has triggered the UE 120 to create an ePHR and the UE 120 is transmitting on a Physical Uplink Shared Channel (PUSCH) without transmitting on PUCCH, the UE may calculate the power headroom for the active carrier using the following equation:

$$PH_{type1,c}(i) = P_{CMAX,c}(i)\{10 \log_{10}(M_{PUSCH,c}(i)) + P_{O\_PUSCH,c}(j) + \alpha_c(j) \cdot PL_c + \Delta_{TF,c}(i) + f_c(i)\}$$

Since the UE 120 is only scheduled on one carrier, the complete power $P_{max}$ according to the UEs 120 power class is available for the transmission, unless the UE 120 applies some form of power reduction $P_{reduction}$. The network node 101 may thereby calculate the power reduction $P_{reduction}$ using the following equation:

$$P_{reduction} = P_{max} - P_{cmax,c}$$

where $P_{reduction}$ is the power reduction applied by the UE 120 due to MPR, A-MPR, P-MPR and/or ΔTC. P-MPR is power management maximum power reduction and $\Delta T_{TF,c}$ is other power relaxation affected by the number of CQI/PMI bits included. The usage of P-MPR is indicated explicitly in the ePHR. The maximum values for the other power reductions are specified in 3GPP TS 36.101 rel. 10. This allows the network node 101 to calculate the power reduction applied by the UE 120 for the specific allocation which the UE 120 has reported the ePHR for.

When no power reduction information for the received UE identification in a MPR region is available to the network node 101, or when the UE identification is unknown, the network node may assume that the UE 120 applies the maximum power reduction allowed according to 3GPP TS 36.101 rel. 10, i.e. when the ratio R=1.

Further, a ratio $R(A_k, M_k, B_k, x_k)$ between the power reduction, and the maximum allowed power reduction as specified in 3GPP TS 36.101 rel. 10 may be determined based on the received information about the power headroom. The ratio $R(A_k, M_k, B_k, x_k)$, which refers to the k:th ratio value R for this specific UE identification, such as e.g. the masked IMEISV for the UE 120, and the transmission occurred with PRB allocation portion $A_k$, modulation $M_k$ in band $B_k$ with any other argument $x_k$, may be used to represent the connection and relation between the actual power reduction and MPR. However, this relation may also be represented by for example the absolute value difference between the power reduction and the MPR.

Action 3024: The network node 101 may further store the information about the reduced power for the UE type indicated by the identification and for the corresponding allocation.

The information about the reduced power may be stored in the network node 101 or in a second network node, such as a radio base station, a core network node or in a distributed node comprised in the cloud 141. The network node 101 may send the stored information about the reduced power may sent to these other network nodes. The stored information about the reduced power may be sent to other network nodes, during a connection, a re-connection and/or a handover procedure of the UE 120.

The absolute value of the power reduction and/or the ratio R may be stored together with the frequency band, the allocated Resource Blocks (RBs) which may be a non-continuous allocation, a modulation scheme of the received PUSCH, a system bandwidth and/or other power reduction related parameters which the power reduction ratio relates to.

Action 3025: When information about the reduced power is available to the network node 101 for the received UE type and at least a first allocation, the network node 101 may interpolate and/or extrapolate the available information about the reduced power, in order to obtain the power reduction for a second allocation for which no information about the reduced power is available to the network node 101. The power reduction data may be provided by scheduling the UE 120 in UL when the UE 120 has data for transmission.

When at least one power reduction value is known for the UE 120, the network node 101 may assume that the ratio R will be applied for all PUSCH allocations in all MPR regions or in all PUSCH allocations in the MPR region A, in which the ratio R is known. In other regions the network node 101 may assume maximum power reduction to be applied by the UE 120.

In order to improve the result, the network node 101 may further trigger the UE 120 to send a report comprising the power headroom by perform the action 3021, in order to collect the power reduction information for unknown allocations and/or for allocations for which the power reduction has been interpolated and/or extrapolated.

Figure 5:
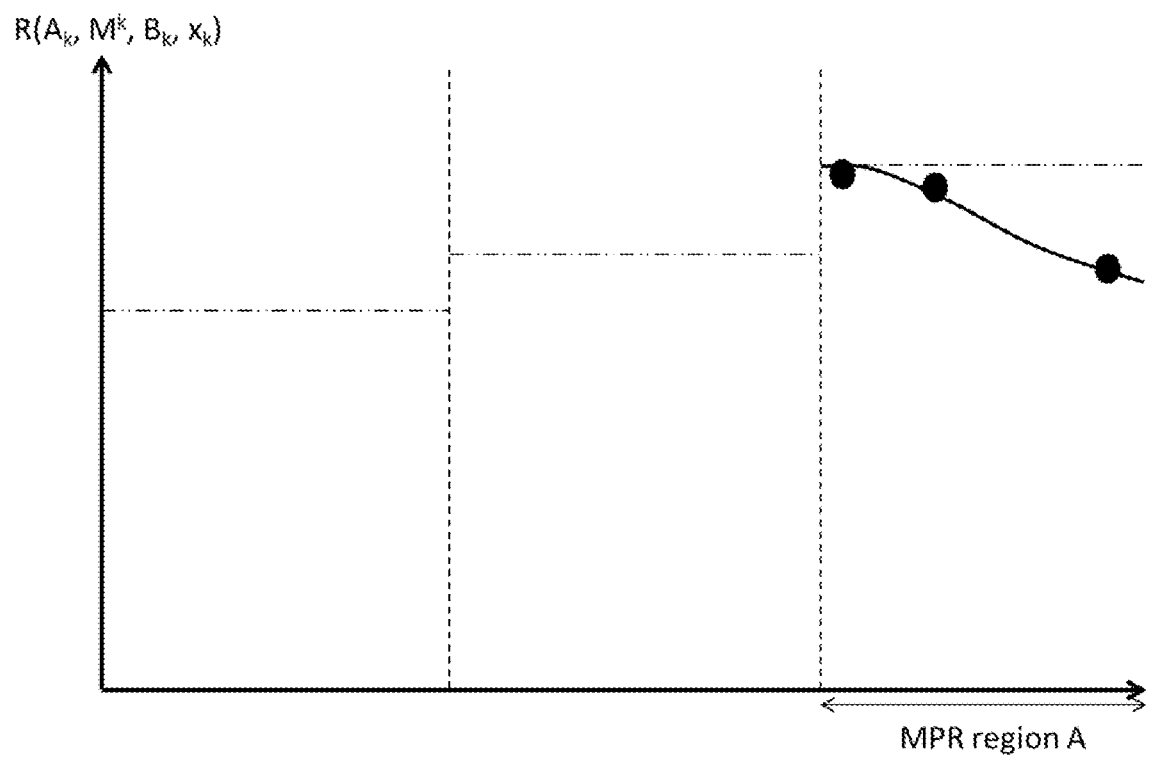
FIG. 5 is a chart illustrating interpolation and/or extrapolation of a power reduction value according to one embodiment herein.

When more power reduction information values have been collected for the UE type identified, e.g. based on a masked IMEISV, then the ratio R is set per MPR region A and the ratios may be interpolated or extrapolated within the MPR regions with known ratio's. FIG. 5 discloses a scenario where interpolation and/or extrapolation is used by the network node 101 in order to determine the power reduction for a scheduling occasion of a UE 120, when the UE specific power reduction is not known for the scheduling occasion. The network node 101 may apply interpolation or extrapolation within the MPR region A.

An UL transmission may occur with a PRB allocation portion $A_k$, a modulation $M_k$ in a band $B_k$ and with any other argument $x_k$. The ratio R for the specific allocation ($A_k$, $M_k$, $B_k$, $x_k$) may be determined any time an ePHR is received from the UE 120. The ratios are sorted and stored per UE identification, such as e.g. the masked IMEISV. Interpolation or extrapolation may then be applied on the stored ratios $R(A_k, M_k, B_k, x_k)$ to obtain a new ratio R(A, M, B, x) for a missing power reduction, such as e.g. a power reduction for an allocation which has not been previously stored.

Action 3026: When a power reduction information is available to the network node 101 for the received UE identification and a current UE allocation the obtaining may comprise retrieving the information about the reduced power for the current allocation of the UE 120. The information may be available to the network node 101 from a storage, such as a memory in the network node 101 or in a second network node, such as a radio base station, a core network node or in a distributed node comprised in the cloud and may be retrieved from the storage by the network node 101.

When a UE 120 enters a cell of the network node 101 it may not always be necessary to collect the power reduction information since the information may already be stored and may be obtained via the identification, such as the IMEISV, of the UE 120. The information may be stored for each identification of the UE 120, such as a masked IMEISV and it may be signaled to the network node 101 from the network node in which the information is stored as part of a UE connection procedure. For example, for initial access, the identification may be provided to the network node 101 by e.g. the core network node, such as an MME, and for inter-cell handover the identification of the UE 120 may be provided to the target network node by the source network node.

Action 3030: The network node 101 further selects an allocation for transmissions to the UE 120, based on the obtained reduced power applied by the UE 120.

The allocation may e.g. comprise the Modulation and Coding Scheme (MCS), the Physical Resource Blocks (PRBs), the modulation and or the band to be used for UL transmissions from the UE 120. The allocation is selected in order to limit power reduction of the UE 120 as much as possible, thereby allowing the UE 120 to transmit with a maximum power available in the UE 120, which improves the performance of the network 100.

Action 3040: The network node 101 may further send the selected allocation to the UE 120 for transmissions from the UE 120.

Figure 6:
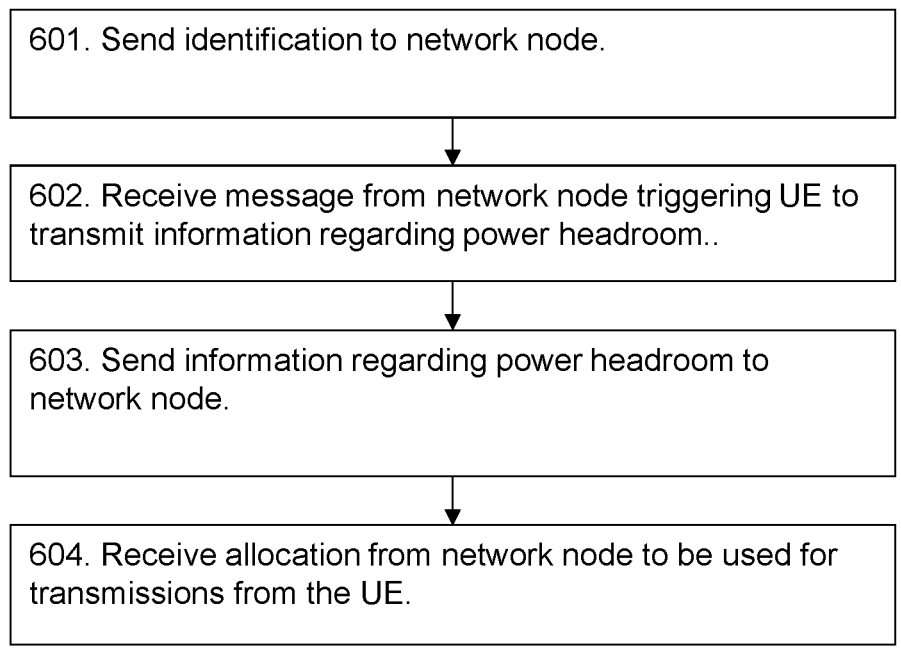
FIG. 6 is a flowchart depicting embodiments of a method in a UE.

Example of embodiments of a method in the UE 120 for enabling a handling of specific power reduction for the UE 120 will now be described with reference to a flowchart depicted in FIG. 6. The method comprises the following actions, which actions may be taken in any suitable order.

Action 601: The UE 120 sends a message comprising an identification of a specific type of the UE 120 to the network node 101. The type of the UE 120 may e.g. be the brand, the type, the model and/or the software of the UE 120.

Action 602: The UE 120 receives a message triggering the UE 120 to transmit information regarding an available power headroom for one or more allocations from the network node 101.

Action 603: The UE 120 sends a report to the network node 101 comprising information regarding the available power headroom for the UEs allocation and a maximum power for the allocation.

Action 604: The UE 120 may further receive a message from the network node 101 comprising an allocation to be used for transmissions from the UE 120, which allocation has been determined based on the reported information regarding the available power headroom for the UEs allocation and a maximum power for the allocation.

Figure 7:
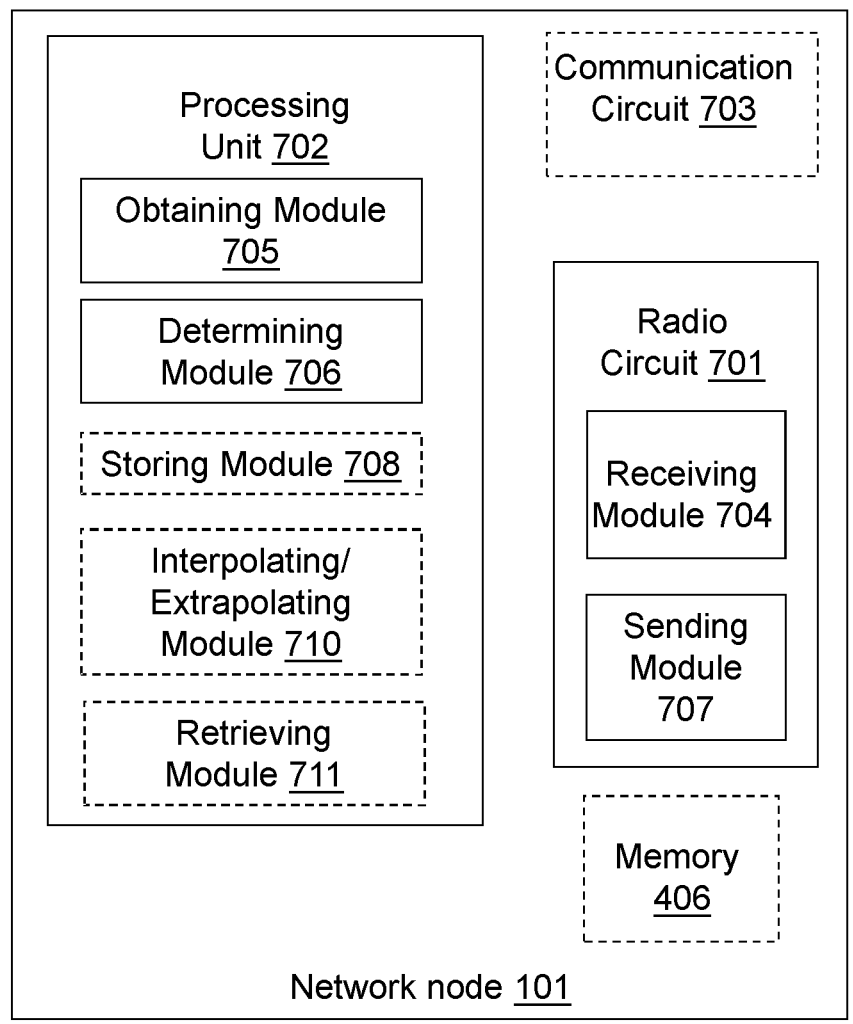
FIG. 7 is a schematic block diagram illustrating embodiments of a network node.

To perform the method actions for handling of specific power reduction for a User Equipment (UE) 120 described above in relation to FIG. 3, the network node 101 may comprise the following arrangement depicted in FIG. 7. Dashed lines of a box in FIG. 7 indicate that this box is not mandatory.

The network node 101 comprises a radio circuitry 701 to communicate with UEs 120 and a processing unit 702. The network node 101 may further comprise a communication circuitry 703 to communicate with other network nodes, which communication circuitry 703 may e.g. be an X2 interface.

The network node 101 may be configured to, e.g. by means of a receiving module 704 being configured to, receive a message from the UE 120 comprising an identification of a specific type of the UE 120. The network node 101 may further be configured to, e.g. by means of an obtaining module 705 being configured to, obtain a reduced power applied by the UE 120 corresponding to the received identification.

The network node 101 may further be configured to, e.g. by means of the receiving module 704 or the obtaining module 705 being configured to, receive a report from the UE 120 comprising information regarding the available power headroom for an allocation of the UE 120 and a maximum power available for the allocation.

The network node 101 may further be configured to, e.g. by means of a determining module 706 or the obtaining module 705 being configured to, determine the reduced power applied by the UE 120 based on the received available power headroom and the maximum power for the allocation.

The network node 101 may be configured to, e.g. by means of a sending module 707 being configured to, send a message to the UE 120 triggering the UE 120 to transmit information regarding an available power headroom for one or more allocations.

The network node 101 may further be configured to, e.g. by means of a storing module 708 and or a memory 709 being configured to, store the information about the reduced power for the UE type 120 indicated by the identification and for the corresponding allocation.

The network node 101 may further be configured to, e.g. by means of the storing module 708 and or the sending module 707 being configured to, store the information about the reduced power in the network node 101, a second network node and/or in a central place of the communications network 100, such as for example in a core network node or in a distributed node comprised in the cloud 141.

The network node 101 may further be configured to, e.g. by means of the sending module 707 being configured to, send the stored information about the reduced power to other network nodes, such as a radio base station and/or a core network node.

The network node 101 may further be configured to, e.g. by means of the sending module 707 being configured to, send the stored information about the reduced power to other network nodes, during a connection, a re-connection and/or a handover procedure of the UE 120.

The network node 101 may further be configured to, e.g. by means of the obtaining module 705 and/or an interpolating/extrapolating module 710 being configured to, when an information about the reduced power is available for the received UE type and at least a first allocation, interpolate and/or extrapolate the available information about the reduced power, to obtain the power reduction for a second allocation for which no information about the reduced power is available to the network node 101.

The network node 101 may further be configured to, e.g. by means of the obtaining module 705 and/or a retrieving module 711 being configured to, when a power reduction information is available to the network node 101 for the received UE identification and a current UE allocation, retrieve the information about the reduced power for the current allocation of the UE 120.

Figure 8:
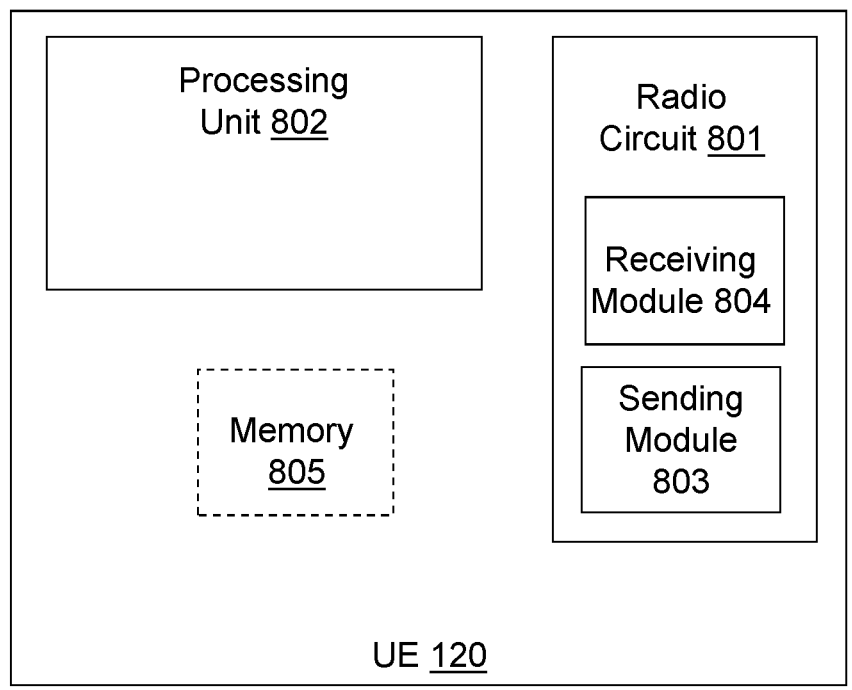
FIG. 8 is a schematic block diagram illustrating embodiments of a UE.

To perform the method actions for enabling a handling of specific power reduction for a UE described above in relation to FIG. 6, the UE 120 may comprise the following arrangement depicted in FIG. 8. Dashed lines of a box in FIG. 6 indicate that this box is not mandatory.

The UE 120 comprises a radio circuitry 801 to communicate with a network node 101 and a processing unit 802.

The UE 120 is configured to, e.g. by means of a sending module 803 and/or the radio circuitry 801 being configured to, send a message to the network node 101 comprising an identification of a specific type of the UE 120.

The UE 120 is configured to, e.g. by means of a receiving module 804 and/or the radio circuitry 801 being configured to, receive a message from the network node 101 triggering the UE 120 to transmit information regarding an available power headroom for one or more allocations.

The UE 120 is configured to, e.g. by means of the sending module 803 and/or the radio circuitry 801 being configured to, send a report to the network node 101 comprising information regarding the available power headroom for the UEs allocation and a maximum power available for the allocation.

The embodiments herein for handling or enabling a handling of specific power reduction for a UE 120 may be implemented through one or more processors, such as the processing unit 702 in the network node 101 depicted in FIG. 7 or the processing unit 802 in the UE 120, together with computer program code for performing the functions and actions of the embodiments herein. The program code mentioned above may also be provided as a computer program product, for instance in the form of a data carrier carrying computer program code for performing the embodiments herein when being loaded into the network node 101, the UE 120 and/or the core network node. One such carrier may be in the form of a CD ROM disc. It is however feasible with other data carriers such as a memory stick. The computer program code may furthermore be provided as pure program code on a server and downloaded to the network node 101 and/or the core network node.

The network node 101 and the UE 120 may further comprise a memory 709, 805 comprising one or more memory units. The memory 709, 805 is arranged to be used to store obtained information, measurements, data, configurations, schedulings, and applications to perform the methods herein when being executed in the network node 101 and/or the UE 120.

Those skilled in the art will also appreciate that the receiving module 704, the obtaining module 705, the determining module 706, the sending module 707, the storing module 708, the interpolating module 710, the retrieving module 711, the sending module 803 and/or the receiving module 804 described above may refer to a combination of analog and digital circuits, and/or one or more processors configured with software and/or firmware, e.g. stored in the memory 709 and/or 805 that when executed by the one or more processors such as the processing unit 702 and/or the processing unit 802 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of". When using the word "set" herein, it shall be interpreted as meaning "one or more".

The embodiments herein are not limited to the above described embodiments. Various alternatives, modifications and equivalents may be used. Therefore, the above embodiments should not be taken as limiting the scope of the embodiments as defined by the appended set of claims. The embodiments herein also applies to the multi-point carrier aggregation systems.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method, performed by a network node, for handling of specific power reduction for a User Equipment, UE, configured to report an extended Power Headroom, wherein the method comprises:
   receiving, from the UE, a message comprising an identification of a specific type of the UE,
   obtaining a reduced power applied by the UE corresponding to the received identification,
   selecting an allocation for transmissions from the UE, based on the reduced power applied by the UE, and
   storing information about the reduced power for the specific type of the UE indicated by the identification and for the corresponding allocation;
   wherein the obtaining comprises:
      receiving, from the UE, a report comprising information regarding an available power headroom for an allocation of the UE and a maximum power for the allocation and
      determining the reduced power applied by the UE based on the received available power headroom and the maximum power for the allocation; and
   wherein selecting the allocation for transmission from the UE is determined based on stored values of determined reduced power of UEs indicated by the corresponding identifications of specific types of UEs which previously connected to a cell of the network node.

2. The method according to claim 1, wherein the method further comprises:
sending, to the UE, a message triggering the UE to send the report comprising the information regarding the available power headroom for one or more allocations.

3. The method according to claim 2, wherein the message triggering the UE to send the report is an Activation/Deactivation MAC Control Element.

4. The method according to claim 1, wherein the report may be received in an extended Power Headroom Report, ePHR, MAC Control Element.

5. The method according to claim 1, wherein the stored information about the reduced power is sent to other network nodes, during a connection, a re-connection and/or a handover procedure of the UE.

6. The method according to claim 1, wherein the obtaining further comprises, when information about the reduced power is available for the received UE type and at least a first allocation:
interpolating and/or extrapolating the available information about the reduced power, to obtain the power reduction for a second allocation for which no information about the reduced power is available to the network node.

7. The method according to claim 1, wherein the obtaining further comprises, when power reduction information is available to the network node for the received UE identification and a current UE allocation:
retrieving the information about the reduced power for the current allocation of the UE.

8. The method according to claim 1, wherein the identification is based on an International Mobile station Equipment Identity Software Version, IMEISV.

9. A network node, for handling of specific power reduction for a User Equipment, UE, wherein the network node is configured to:
receive, from the UE, a message comprising an identification of a specific type of the UE,
obtain a reduced power applied by the UE corresponding to the received identification,
select an allocation for transmissions from the UE, based on the reduced power applied by the UE, and
store information about the reduced power for the specific type of the UE indicated by the identification and for the corresponding allocation;
wherein the network node is configured to obtain the reduced power applied by the UE corresponding to the received identification by being configured to:
receive, from the UE, a report comprising information regarding an available power headroom for an allocation of the UE and a maximum power for the allocation, and
determine the reduced power applied by the UE based on the received available power headroom and the maximum power available for the allocation; and
wherein the network node is configured to select the allocation for transmission from the UE based on stored values of determined reduced power of UEs indicated by the corresponding identifications of specific types of UEs which previously connected to a cell of the network node.

10. The network node according to claim 9, wherein the network node further is configured to:
send, to the UE, a message triggering the UE to transmit information regarding an available power headroom for one or more allocations.

11. The network node according to claim 10, wherein the network node is configured to send an Activation/Deactivation MAC Control Element to trigger the UE to send the report.

12. The network node according to claim 9, wherein the network node is configured to receive the report in an extended Power Headroom Report, ePHR, MAC Control Element.

13. The network node according to claim 9, wherein the network node, when information about the reduced power is available for the received UE type and at least a first allocation, in order to obtain the reduced power, is further configured to:
interpolate and/or extrapolate the available information about the reduced power, to obtain the power reduction for a second allocation for which no information about the reduced power is available to the network node.

14. The network node according to claim 9, wherein the network node, when a power reduction information is available to the network node for the received UE identification and a current UE allocation, in order to obtain the reduced power is further configured to:
retrieve the information about the reduced power for the current allocation of the UE.

* * * * *